United States Patent Office 2,915,363
Patented Dec. 1, 1959

2,915,363

METHOD OF RECOVERING THORIA

John H. Gross, Lakeland, Fla., assignor to International Minerals & Chemical Corporation, a corporation of New York No Drawing. Application June 21, 1956
Serial No. 592,744

11 Claims. (Cl. 23—14.5)

This invention relates to the recovery of thoria from materials and ores containing thorium in various chemical forms. More particularly, it relates to the recovery of thoria from solutions obtained by digestion of ferruginous ores containing thorium values in essentially the silicate form.

Thorium-bearing ores of most common occurrence are monazite, a thorium-rare earth phosphate and thorite, which contains the thorium in essentially the silicate form. These ores require markedly different treatments to convert the mineral values to water soluble form. Recovery of thorium from monazite ore has been accomplished by treatment by which the monazite ores, or monazite concentrate is reacted with concentrated sulfuric acid. The reaction products are removed by leaching with water and then the thorium precipitated, for example, from the sulfate solution by the addition of sodium fluoride.

Thorite type ores, on the other hand, have been digested with dilute sulfuric acid to convert thorium, rare earths, and other minerals to water soluble sulfate form. The water solution of the sulfate reaction products may be precipitated by addition of hydrofluoric acid, sodium fluoride, and the like, in quantities in excess of the stoichiometric amount required for reaction with thorium. These precipitated thorium products have all been highly contaminated and require extensive purification operations to produce relatively pure thorium compounds.

It is a primary object of this invention to provide a process wherein thorium is recovered in the form of useful thorium oxide.

It is still another object of this invention to provide a novel process for conversion of thorium fluoride to thorium oxide.

These and other objects of the invention will be apparent from the following description.

Briefly, the improved process of this invention comprises digestion of the thorium-bearing material with a mineral acid, separating the insoluble material from the aqueous solution of water soluble reaction products, precipitating thorium fluoride either substantially pure, or in a mixture, with rare earth fluorides, mixing fluoride precipitate with at least the stoichiometric equivalent amount of alkali metal reactant, fusing the reactant-fluoride mixture, and leaching the fused mixture with water to recover thorium in the form of insoluble thorium oxide and fluoride in the form of a water solution which may be used for precipitation of additional thorium fluoride.

More in detail, a dilute mineral acid such as sulfuric acid is employed to recover thorium from a predominantly thorium silicate-bearing ore such as is found at Wet Mountains, Colorado, and Lemhi Pass, Montana. The thorium-bearing ore may be fed to the process or the ore may be subjected to classification and beneficiation steps to produce a concentrate for feed to the process. If ore is fed to the process, the thorium content thereof will generally fall in the range of about 0.35% $ThO_2$ to about 2.5% $ThO_2$, with the average being about 1.1% $ThO_2$. Concentrates for use in the process generally have a $ThO_2$ content in the range between about 3 and about 12% $ThO_2$. The thorium source material is generally utilized in finely ground form, i.e., about 80% to about 100% being capable of passing through a 100 mesh standard screen. Less finely ground material may be used, but subsequent digestion requires a considerably higher temperature to achieve substantially complete conversion of thorium to the water soluble sulfate form.

In the process as dealing with thorium silicate materials, the sulfate acid may be of any convenient dilution, usually in the range between about 10% and about 60% sulfuric acid. The acid is added in quantities such that there will be present in the slurry mix between about 30% and about 300% of the stoichiometric equivalent amount of acid necessary to convert the thorium, rare earths, iron calculated as ferric iron, aluminum and calcium to the sulfate form. Amounts of acid in excess of the stoichiometric equivalent amount effect substantially complete solution of thorium and rare earths.

Time of digestion will vary with both acid concentration and temperature of digestion mix. The higher the acid concentration and the higher the temperature, the shorter the digestion period. Generally, a digestion period of from about ½ to 4 hours is preferred and can be accomplished with a temperature maintained in the range between about 80° C. and about 105° C.

Solids-free sulfate solution recovered in the above-described process is treated with a fluoride precipitating agent to separate the insoluble thorium fluoride material. When starting with an ore concentrate analyzing $ThO_2$, 10.1%; $SiO_2$, 36.6%; rare earths, 1.1%; and digesting with 20% sulfuric acid solution as above described, recovery of thorium in excess of 90% was obtained, the solution analyzing $ThO_2$, 0.59% and rare earths, 0.064%. Treating the above-described clear liquor obtained after filtration with hydrofluoric acid or water soluble alkali metal fluorides such as sodium fluoride, potassium fluoride, and the like, brings down a precipitate depending upon the raw materials source having thorium present as a fluoride in proportions equivalent to between about 35% $ThO_2$ and 70% $ThO_2$ and fluorides of the rare earths in proportions equivalent to between about 2% and about 30% rare earth oxides.

Precipitate recovered in the above fluoride precipitation or by precipitation from a solution obtained by leaching water soluble reaction products of a monazite-$H_2SO_4$ reaction, may be utilized in the heat treatment step either in the form of a wet cake or a wet slurry or in a dry form. Alkali metal reactant may be added to the fluoride precipitate either as a dry solid or as a solution, the primary problem being one of mixing the material to cause intimate association of the reactant with fluoride material. Preferably, a heavy slurry is mixed with dry reactant in suitable mixing equipment such as a pug mill.

Alkali metal reactants useful in this heat treatment step are the alkali metal carbonates such as sodium carbonate and potassium carbonate, alkali metal hydroxides such as sodium hydroxide, potassium hydroxide, alkali metal salts of organic acids such as sodium formate, sodium acetate, sodium oxalate, and the like.

Reaction between fluoride precipitates and alkali metal carbonate is carried out by heat treatment at fusion temperatures. This heat treatment step consists of heating the mixture in suitable equipment such as a rotary kiln, shaft furnace, or the like, to a temperature sufficiently high to fuse alkali metal carbonate. Generally the heat treatment is carried out in a temperature range of about 900° C. and 1200° C. when reacting sodium carbonate and fluoride precipitate. Higher or lower temperatures may be used depending upon the particular combination of reactants. When the mixture has become fluid, the material is withdrawn to a cooling pit or the material is hit with high pressure stream of water so that the product is disintegrated and instantaneously cooled. After cooling the solidified melt is leached with water to remove excess alkali metal reactant salt and the alkali metal fluoride formed by the reaction with thorium-rare earth fluoride mixture. Upon leaching with boiling water, a fine solid residue remains consisting of high grade $ThO_2$. The leach solution, with or without concentration, is recycled to the precipitation step.

The invention will be further understood from the following examples, which are given by way of illustration and without any intention that the invention be limited thereto.

*Example I*

A thorite ore from the Lemhi Pass section of Montana was ground to pass 100 mesh and analyzed. It contained

|  | Percent |
|---|---|
| $ThO_2$ | 1.28 |
| Rare earth oxides | 0.784 |
| $Fe_2O_3$ | 7.74 |
| $Al_2O_3$ | 0.92 |
| $SiO_2$ | 65.9 |

Two thousand parts by weight of the ground ore were mixed with 2600 parts by weight of sulfuric acid containing 20% $H_2SO_4$ by weight. The mixture was agitated and heated to maintain the temperature between 90 and 95° C. for two hours. The slurry then was filtered under vacuum to give about 2560 parts by weight of strong liquor which on analysis was found to contain

|  | Percent |
|---|---|
| $ThO_2$ | 0.96 |
| Rare earth oxides | 0.57 |
| $Fe_2O_3$ | 3.53 |
| $Al_2O_3$ | 0.077 |
| $SO_4$ | 19.91 |

To 2000 parts by weight of the strong liquor from ore digestion were added 12.23 parts by weight of sodium fluoride dissolved in water to make a 3% solution. This amount of sodium fluoride was sufficient to provide about 4 fluoride atoms for each thorium atom in the solution. After the mixture had been agitated at room temperature for one hour, a precipitate had formed. The precipitate was separated by filtration, washed, dried, and analyzed. It was found to contain

|  | Percent |
|---|---|
| $ThO_2$ | 65.65 |
| Rare earth oxides | 3.37 |
| F | 14.7 |

Five parts by weight of the thorium fluoride precipitate were mixed with 2.09 parts by weight of sodium carbonate, calculated to be equivalent to the fluoride content of the thorium fluoride precipitate. The mixture was heated for fifteen minutes at 950° C. at which temperature fusion occurred. After cooling, the reaction mass was leached with 150 parts of water at the boiling point for one hour, and was allowed to stand overnight at room temperature. It was then filtered, and the solids were washed with water which was combined with strong liquor to make a total of 207 parts of solution.

The solids from leaching were dried and analyzed to contain

|  | Percent |
|---|---|
| $ThO_2$ | 96.02 |
| Rare earth oxides | 2.07 |
| F | 0.062 |

The solution was analyzed to contain

|  | Percent |
|---|---|
| $Na_2O$ | 0.63 |
| F | 0.22 |
| $CO_2$ | 0.0055 |

This solution was used for further precipitation of thorium fluoride from sulfuric acid digestion solutions as described above.

*Example II*

Five parts by weight of the thorium fluoride precipitate described in the preceding example were mixed with 4.18 parts by weight of sodium carbonate, calculated to be twice the amount equivalent to fluoride content of the thorium fluoride. The mixture was heated for fifteen minutes at 950° C., at which temperature fusion took place. After cooling, the reaction mass was leached and washed as in the previous example, giving 186 parts of solution which contained

|  | Percent |
|---|---|
| $Na_2O$ | 1.41 |
| F | 0.383 |
| $CO_2$ | 0.30 |

The dried solids from leaching contained

|  | Percent |
|---|---|
| $ThO_2$ | 96.19 |
| Rare earth oxides | 3.10 |
| F | 0.11 |

Having thus described my invention, what I claim is:

1. The method of recovering thorium oxide from ore selected from the group consisting of thorium silicates and phosphates, which comprises digesting said ore with an aqueous solution of sulfuric acid, separating insoluble material from the aqueous solution of water soluble reaction products, adding to the aqueous solution a water soluble inorganic fluoride reactant to produce a thorium fluoride precipitate, mixing said fluoride precipitate in solid form with a solid alkali metal oxygen-containing basic reactant, said alkali metal reactant being employed in at least the stoichiometric proportion required to form alkali metal fluoride with the fluorine present in said precipitate, fusing the reactant-fluoride mixture, and water leaching the fused mixture to directly recover a residue containing thorium as thorium oxide.

2. The process of claim 1 wherein the alkali metal reactant is sodium carbonate.

3. The process of claim 1 wherein the alkali metal reactant is potassium carbonate.

4. A method of recovering thorium oxide from ore selected from the group consisting of thorium silicates and phosphates, which comprises digesting said ore with an aqueous solution of sulfuric acid, separating insoluble material from the aqueous solution of water soluble reaction products, adding to the aqueous solution a water soluble inorganic fluoride reactant to produce a thorium fluoride precipitate, mixing said fluoride precipitate in solid form with a solid alkali metal oxygen-containing basic reactant selected from the group consisting of carbonates, hydroxides, and alkali metal salts of weak carboxylic acids, said alkali metal reactant being employed in at least the stoichiometric proportion required to form alkali metal fluoride with the fluorine present in said precipitate, fusing the reactant-fluoride mixture, and water leaching the fused mixture to directly recover a residue containing thorium as thorium oxide.

5. The method of recovering thorium oxide from ore selected from the group consisting of thorium silicates and phosphates, which comprises digesting said ore with an aqueous solution of sulfuric acid, separating insoluble material from the aqueous solution of water soluble reaction products, adding to the aqueous solution a water soluble inorganic fluoride reactant to produce a thorium fluoride precipitate, mixing said fluoride precipitate in solid form with a solid alkali metal oxygen-containing basic reactant, said alkali metal reactant being employed in at least the stoichiometric proportion required to form alkali metal fluoride with the fluorine present in said precipitate, fusing the reactant-fluoride mixture at a temperature between about 900 and about 1200° C., and water leaching the fused mixture to directly recover a residue containing thorium as thorium oxide.

6. A method of recovering thorium oxide from ore selected from the group consisting of thorium silicates and phosphates, which comprises digesting said ore with an aqueous solution of sulfuric acid, separating insoluble material from the aqueous solution of water soluble reaction products, adding to the aqueous solution sodium fluoride to produce a thorium fluoride precipitate, mixing said fluoride precipitate with at least the stoichiometric proportion of solid sodium carbonate required to form sodium fluoride with the fluorine present in said precipitate, fusing the sodium carbonate-thorium fluoride mixture at a temperature of between about 900 and about 1200° C., water leaching the fused mixture to directly recover a residue containing thorium as thorium oxide and a predominantly sodium fluoride solution, and recycling said solution to the thorium fluoride precipitation step.

7. The method of recovering thorium oxide from thorium fluoride which comprises mixing solid thorium fluoride with a solid alkali metal oxygen-containing basic reactant, said alkali metal reactant being employed in at least the stoichiometric proportion required to form alkali metal fluoride with the fluorine present in said precipitate, fusing the reactant-fluoride mixture, and water leaching the fused mixture to directly recover a residue containing thorium as thorium oxide.

8. The method of recovering thorium oxide from thorium fluoride which comprises mixing solid thorium fluoride with a solid alkali metal oxygen-bearing basic reactant selected from the group consisting of the carbonates, hydroxides, and weak carboxylic acid salts of alkali metals, said alkali metal reactant being employed in at least the stoichiometric proportion required to form alkali metal fluoride with the fluorine present in said precipitate, fusing the reactant-fluoride mixture, and water leaching the fused mixture to directly recover a residue containing thorium as thorium oxide.

9. The method of recovering thorium oxide from thorium fluoride which comprises mixing solid thorium fluoride with a solid alkali metal oxygen-containing basic reactant, said alkali metal reactant being employed in at least the stoichiometric proportion required to form alkali metal fluoride with the fluorine present in said precipitate, fusing the reactant mixture at a temperature of between about 900 and about 1200° C., and water leaching the fused mixture to directly recover a residue containing thorium as thorium oxide.

10. The method of recovering thorium oxide from thorium fluoride, which comprises mixing solid thorium fluoride with at least the stoichiometric proportion of solid sodium carbonate required to form sodium fluoride with the fluorine present in said thorium fluoride, fusing the sodium carbonate-thorium fluoride mixture, and water-leaching the fused mixture to directly recover a residue containing thorium as thorium oxide.

11. The method of recovering thorium oxide from thorium fluoride, which comprises mixing solid thorium fluoride with at least the stoichiometric proportion of solid potassium carbonate required to form potassium fluoride with the fluorine present in said thorium fluoride, fusing the potassium carbonate-thorium fluoride mixture, and water-leaching the fused mixture to directly recover a residue containing thorium as thorium oxide.

References Cited in the file of this patent

UNITED STATES PATENTS

| | | |
|---|---|---|
| 1,307,152 | Ryan | June 17, 1919 |
| 1,307,153 | Ryan | June 17, 1919 |
| 1,335,157 | Dietsche | Mar. 30, 1920 |
| 1,368,243 | Davis | Feb. 15, 1921 |

FOREIGN PATENTS

| | | |
|---|---|---|
| 127,555 | Great Britain | Oct. 2, 1919 |
| 164,581 | Great Britain | June 16, 1921 |